(12) United States Patent
Park (10) Patent No.: US 11,214,142 B2
(45) Date of Patent: Jan. 4, 2022

(54) FUEL DOOR AND VEHICLE INCLUDING THE SAME

(71) Applicants: Hyundai Motor Company, Seoul (KR); Kia Motors Corporation, Seoul (KR)

(72) Inventor: June Young Park, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/035,292

(22) Filed: Sep. 28, 2020

(65) Prior Publication Data

US 2021/0362588 A1 Nov. 25, 2021

(30) Foreign Application Priority Data

May 25, 2020 (KR) .................. 10-2020-0062171

(51) Int. Cl.
*B60K 15/05* (2006.01)
*B60K 15/04* (2006.01)

(52) U.S. Cl.
CPC ............. *B60K 15/05* (2013.01); *B60K 15/04* (2013.01); *B60K 2015/0422* (2013.01); *B60K 2015/0561* (2013.01)

(58) Field of Classification Search
CPC B60K 15/05; B60K 15/04; B60K 2015/0409; B60K 2015/0422; B60K 2015/0561

USPC ....................................................... 296/97.22
See application file for complete search history.

(56) References Cited

U.S. PATENT DOCUMENTS

2009/0189410 A1* 7/2009 Gurtatowski .......... B60D 25/00

FOREIGN PATENT DOCUMENTS

KR 10-1776835 B1 9/2017

OTHER PUBLICATIONS

KR1824411B1 (H. H. Joo) Korea, Feb. 1, 2018 (Year: 2018).*

* cited by examiner

*Primary Examiner* — Mahmoud Gimie
(74) *Attorney, Agent, or Firm* — Morgan, Lewis & Bockius LLP

(57) ABSTRACT

Disclosed are a fuel door having a cap sealing structure which obviates a cap for urea solution or water injection and a vehicle including the same. The fuel door includes a protrusion configured to protrude from an inner side of the fuel door and comprising a hollow and at least one cutout part being in fluid communication with the hollow, a membrane member coupled to the protrusion so as to cover the hollow of the protrusion, and a sealing member installed on the protrusion along a circumference of the membrane member.

9 Claims, 10 Drawing Sheets

[ CROSS-SECTION ALONG LINE A-A' ]

FIG. 13C

[ CROSS-SECTION ALONG LINE B-B' ]

FUEL DOOR AND VEHICLE INCLUDING THE SAME

CROSS-REFERENCE TO RELATED APPLICATION

This application claims under 35 U.S.C. § 119(a) the benefit of priority to Korean Patent Application No. 10-2020-0062171 filed on May 25, 2020, the entire contents of which are incorporated herein by reference.

TECHNICAL FIELD

The present disclosure relates to a fuel door and a vehicle including the same. More particularly, it relates to a cap sealing structure of a fuel door for a vehicle, which obviates a cap for urea solution or water injection.

BACKGROUND

Diesel vehicles have exhaust gas aftertreatment systems in order to mitigate the environmental pollution caused by exhaust gas, and among these systems, there is a selective catalytic reduction (SCR) system which adds a urea solution to exhaust gas so as to reduce nitrogen oxides in the exhaust gas into nitrogen and oxygen.

Figure 1:
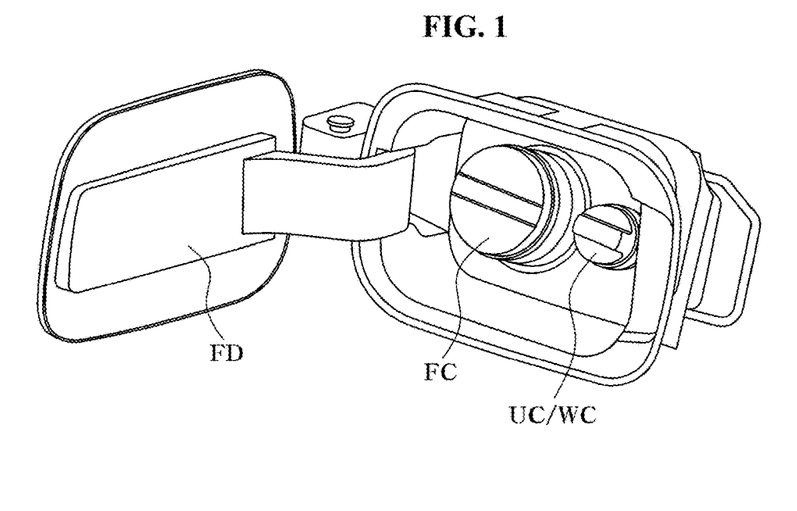
FIG. 1 is a perspective view illustrating an inside of a general fuel door for a vehicle.

In the SCR system, the urea solution must be replenished every certain miles, and in general, as shown in FIG. 1, a urea cap UC mounted on an inlet for urea injection is provided at one side of a fuel cap FC inside a fuel door FD of a vehicle.

Further, in order to improve the fuel economy and performance of the vehicle, a water injection system may be used in certain vehicles, which requires a tank to store water. A water injection cap WC is provided together with the fuel cap FC inside the fuel door FD in the same manner as the urea solution. In FIG. 1, the urea cap UC and the water injection cap WC are represented as the same element (hereinafter, when it is not necessary to distinguish the urea cap UC and the water injection cap WC from each other, they will be referred to as a cap UC/WC).

A cap is employed in order to make an airtight inlet for urea solution or water injection. The cap prevents external foreign substances from entering the vehicle and the urea solution or water inside the vehicle from leaking out of the vehicle.

If the inlet for the urea solution or water injection is included in a space inside the fuel door FD, the space inside the fuel door FD becomes narrow, which causes the user's inconvenience. For example, when the fuel cap FC or the urea cap/water injection cap UC/WC is opened or closed, the user's hand interferes with peripheral parts.

Particularly, it may be difficult for a user to attach or detach the urea cap UC to or from the inlet due to the urea solution adhered between the inlet and the urea cap UC.

Further, a seal is installed in the cap UC/WC in order to keep the cap UC/WC airtight. When the cap UC/WC is opened or closed, noise may be generated due to friction between the seal and the inlet.

The above information disclosed in this Background section is only for enhancement of understanding of the background of the present disclosure, and therefore it may contain information that does not form the prior art that is already known in this country to a person of ordinary skill in the art.

SUMMARY OF THE DISCLOSURE

The present disclosure has been made in an effort to solve the above-described problems associated with the prior art, and it is an object of the present disclosure to provide a fuel door for a vehicle having a structure where a space inside the fuel door is efficiently used.

It is another object of the present disclosure to provide a fuel door for a vehicle, capable of eliminating the user's inconvenience when a cap for urea solution or water injection is provided inside the fuel door.

It is still another object of the present disclosure to provide a fuel door for a vehicle being freed from contamination of a urea solution and allowing a cap for urea solution to be easily detachable.

It is yet another object of the present disclosure to provide a fuel door for a vehicle having a structure which prevents noise generated by a seal installed in a cap for urea solution or water injection.

In one aspect, the present disclosure provides a fuel door including a protrusion configured to protrude from an inner side of the fuel door and comprising a hollow and at least one cutout part being in fluid communication with the hollow, a membrane member coupled to the protrusion so as to cover the hollow of the protrusion, and a sealing member installed on the protrusion along a circumference of the membrane member.

In an embodiment, the cutout part is disposed in at least a part of a circumference of the protrusion.

In an embodiment, at least one support is provided in the hollow and the membrane member is pressed against the support.

In an embodiment, the membrane member is coupled to the protrusion through ultrasonic welding.

In an embodiment, the sealing member includes a coupling part coupled to an inner side of the protrusion, and the protrusion comprises a receiving part configured to be recessed and to have a shape corresponding to a shape of the coupling part.

In an embodiment, the sealing member has a corrugated shape having a plurality of corrugations.

In one aspect, the present disclosure provides a fuel door pivotally coupled to a vehicle body, a vehicle including a protrusion configured to protrude from an inner side of the fuel door and comprising a hollow and at least one cutout part being in fluid communication with the hollow, a membrane member coupled to the protrusion so as to cover the hollow of the protrusion, a sealing member installed on the protrusion along a circumference of the membrane member, and an inlet protruding from the vehicle body, and configured to contact the sealing member and to be coaxially disposed with the protrusion when the fuel door is closed.

In an embodiment, the inlet may be used to inject a urea solution or water, and a cap may be not installed on the inlet.

In an embodiment, the sealing member may be configured to detach from the inlet when the fuel door is opened.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawings.

DETAILED DESCRIPTION

Hereinafter reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments within the spirit and scope of the disclosure as defined by the appended claims.

In the following description of the embodiments, terms, such as "first" and "second", may be used to describe various elements but do not limit the elements. These terms are used only to distinguish one element from other elements. For example, a first element may be named a second element, and similarly, a second element may be named a first element, without departing from the scope and spirit of the disclosure.

When an element or layer is referred to as being "on," "engaged with," "connected to," or "coupled to" another element or layer, it may be directly on, engaged, connected or coupled to the other element or layer, or intervening elements or layers may be present. In contrast, when an element is referred to as being "directly on," "directly engaged with," "directly connected to," or "directly coupled to" another element or layer, there may be no intervening elements or layers present. Other words used to describe the relationship between elements, e.g., "between" versus "directly between," "adjacent" versus "directly adjacent," etc., should be interpreted in a like fashion.

In the following description of the embodiments, the same elements are denoted by the same reference numerals even when they are depicted in different drawings. The terminology used herein is for the purpose of describing particular exemplary embodiments only and is not intended to be limiting. In the following description of the embodiments, singular expressions may encompass plural expressions, unless they have clearly different contextual meanings. In the following description of the embodiments, terms, such as "comprising", "including", "having", etc., will be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same.

A fuel door according to the present disclosure includes a protrusion configured to protrude from an inner side of the fuel door and comprising a hollow and at least one cutout part being in fluid communication with the hollow, a membrane member coupled to the protrusion so as to cover the hollow, and a sealing member installed on the protrusion along the circumference of the membrane member.

The fuel door according to the present disclosure provides a structure in which a space inside the fuel door is efficiently used.

The fuel door for a vehicle according to the present disclosure obviates a cap for urea solution or water injection, thereby alleviating inconvenience to the user, caused by space constraints due to the installation of an inlet for injecting a urea solution or water near a fuel inlet of a vehicle.

Particularly, since the fuel door for a vehicle according to the present disclosure obviates the cap for urea solution or water injection, a wider space is provided inside the fuel door, which can prevent interference with peripheral parts or regions when the user is handling the cap inside the fuel door.

Further, the fuel door for a vehicle according to the present disclosure, which obviates the cap for urea solution or water injection, can avoid hassles of rotating the cap in every use and may eliminate cumbersomeness in rotation of the cap at every use.

In addition, the fuel door for a vehicle according to the present disclosure, which obviates the cap for urea solution or water injection, may prevent contamination of a cap mounting area by the urea solution and alleviate difficulty in mounting the cap to the inlet due to contamination by the urea solution.

The fuel door for a vehicle according to the present disclosure, which obviates the cap for urea solution or water injection, may prevent noise generated by a seal installed in the cap.

Hereinafter exemplary embodiments of the present disclosure will be illustrated with reference to the accompanying drawings.

Figure 2:
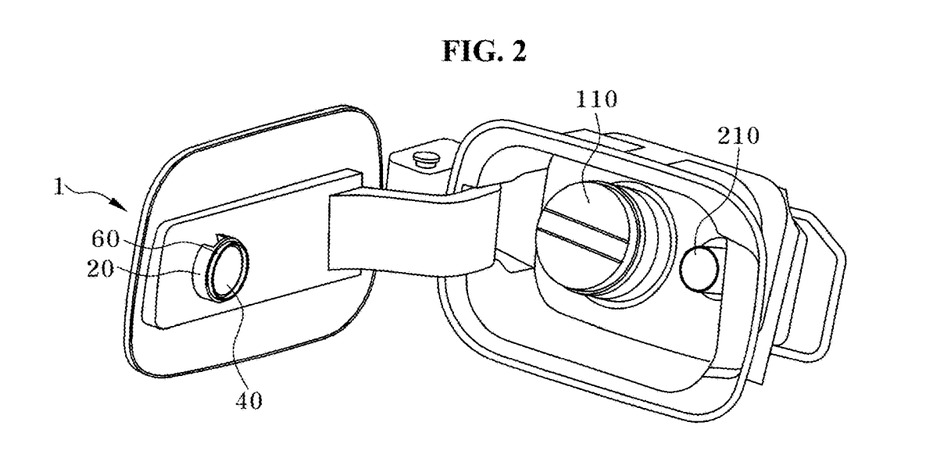
FIG. 2 is a perspective view illustrating a fuel door for a vehicle according to an embodiment of the present disclosure.

As shown in FIG. 2, a fuel door 1 for a vehicle according to the present disclosure includes a protrusion 20, a membrane member 40 and a sealing member 60.

The fuel door 1 is provided on a vehicle body (not shown) so as to be opened and closed. The fuel door 1 is pivotally coupled to the vehicle body and is, thus, opened and closed. A space is provided in the vehicle body by the fuel door 1. In the space, a fuel cap 110 is provided to close a fuel inlet. Together with the fuel cap in the space, an inlet 210 for injecting a urea solution or water (hereinafter referred to as merely the inlet 210) is provided in the space.

The fuel door 1 according to the present disclosure includes the protrusion 20 which protrudes from an inner side of the fuel door. The protrusion 20 protrudes from the inner side of the fuel door 1 to a certain length. Further, the protrusion 20 is substantially coaxial with the inlet 210 in the vehicle body when the fuel door 1 is closed.

Figure 3:
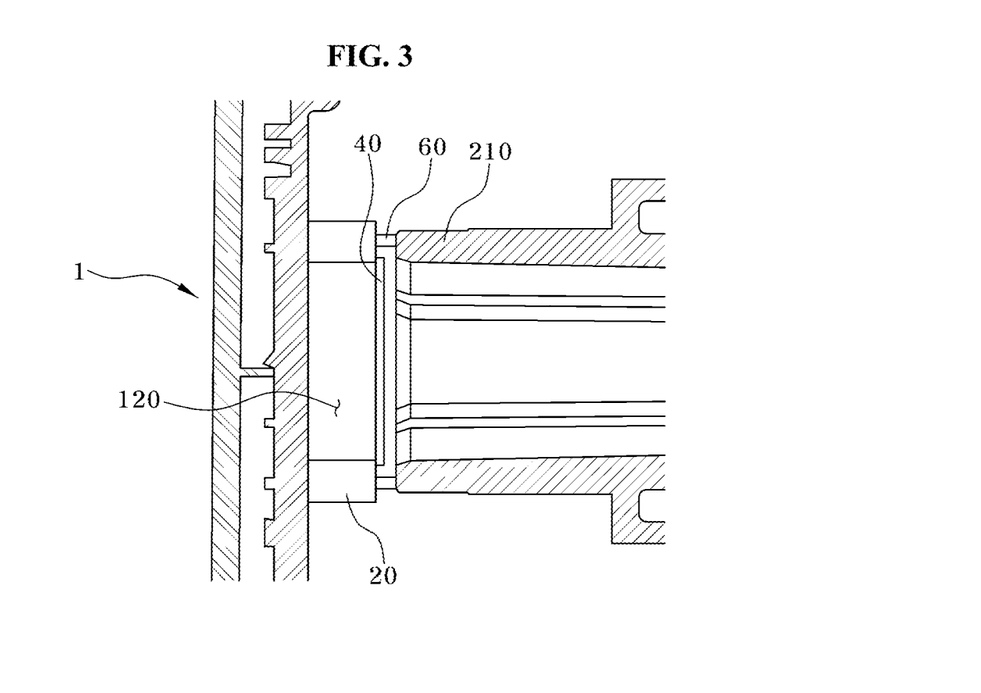
FIG. 3 is a cross-sectional view of the fuel door for a vehicle in a closed state according to an embodiment of the present disclosure.

Referring to FIG. 3, the protrusion 20 includes a hollow 120. The hollow 120 penetrates the protrusion 20. According to an implementation of the present disclosure, the hollow 120 may penetrate a part of the protrusion 20 in a longitudinal direction or penetrate the protrusion 20 all the way in the longitudinal direction to an inner surface of the fuel door 1.

Figure 4:
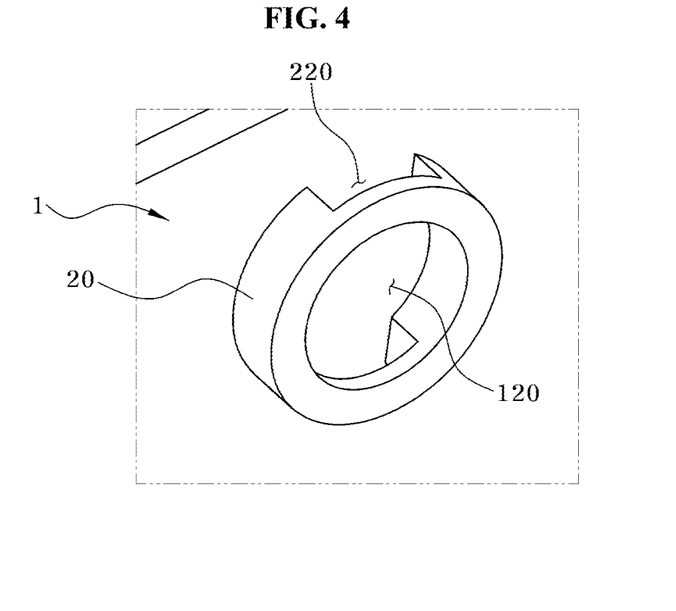
FIG. 4 is a perspective view illustrating a protrusion of the fuel door according to an embodiment of the present disclosure.

As shown in FIG. 4, the protrusion 20 includes at least one cutout part 220, and the at least one cutout part 220 fluidically communicates with the hollow 120. The cutout part 220 serves to facilitate air flow between the inside and the outside of the vehicle.

The cutout part 220 may be a through-hole or a penetrating surface in a circumference of the protrusion 20. According to one implementation of the present disclosure, the cutout part 220 may substantially be rectangular shaped as a non-limiting example. The cutout part 220 may be circular, oval, polygonal, etc., as long as the cutout part 220 is in fluid communication with the hollow 120.

According to an implementation of the present disclosure, the cutout part 220 may be disposed partially in the circumference of the protrusion 20. According to an implementation of the present disclosure, a pair of cutout parts 220 are disposed to face with each other along the circumference of the protrusion 20. However, the number of cutout parts 220 may be increased or decreased and is not limited.

Figure 5:
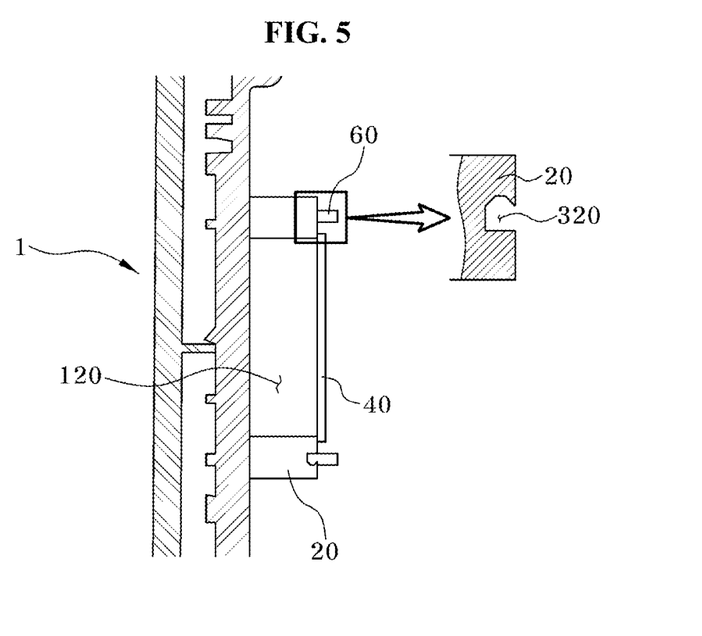
FIG. 5 is a cross-sectional view illustrating a receiving part of the protrusion on the fuel door according to an embodiment of the present disclosure.

Referring to FIG. 5, a receiving part 320 may be provided and recessed inward in the longitudinal direction of the protrusion 20. The receiving part 320 is configured to engage with a coupling part 260 which will be described below. The receiving part 320 has a shape corresponding to the shape of the coupling part 260.

Figure 6A:
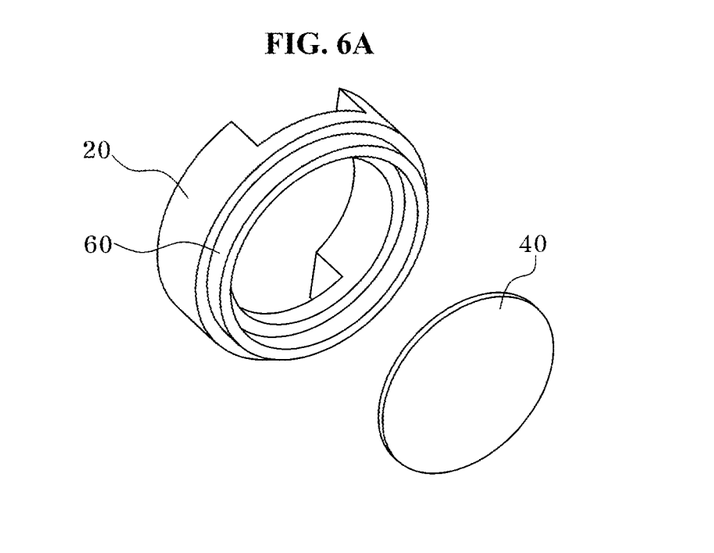
FIG. 6A is a perspective view illustrating the protrusion in a state before a membrane member for the fuel door according to an embodiment of the present disclosure is installed in the protrusion.
Figure 6B:
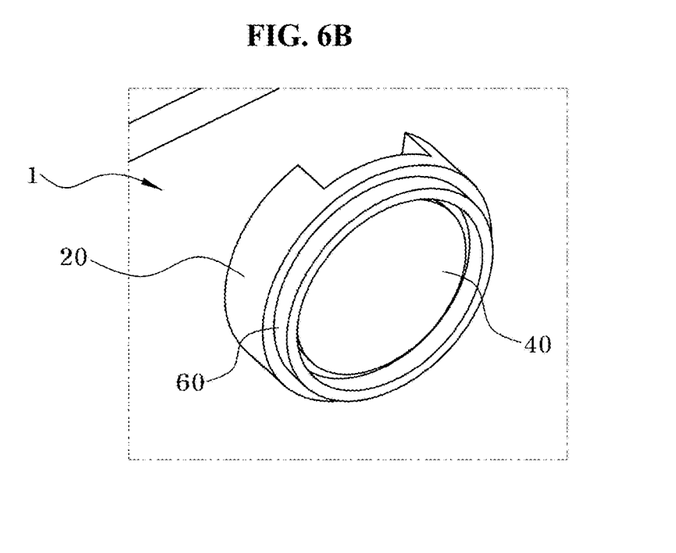
FIG. 6B is a perspective view illustrating the protrusion in a state after the membrane member of the fuel door according to one embodiment of the present disclosure is installed in the protrusion.

As shown in FIGS. 6A and 6B, the membrane member 40 is attached to the protrusion 20 to cover the hollow 120. More particularly, the membrane member 40 is attached to the protrusion 20 so as to cover the cross-section of the hollow 120. A liquid is not allowed to pass through the membrane member 40, whereas a gas is capable of passing the membrane member 40. The membrane member 40 may be formed of any material capable of performing above-mentioned functions without being limited to a specific material.

The membrane member 40 may be attached to the protrusion 20 through any of various methods, including mechanical adhesion, chemical adhesion, etc. According to an implementation of the present disclosure, the membrane member 40 may be coupled to the protrusion 20 through ultrasonic welding. Ultrasonic welding requires a short period of time for coupling, results in excellent quality in coupling, and is environment-friendly compared to other methods.

Figure 7:
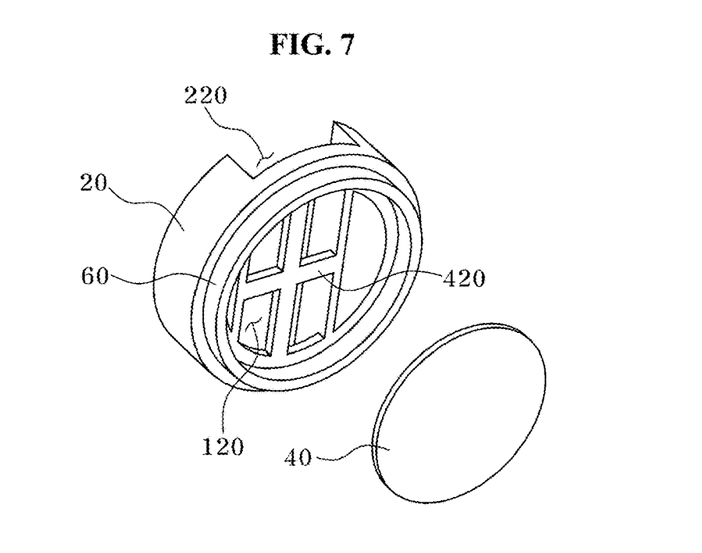
FIG. 7 is a perspective view illustrating at least one support of the fuel door according to an embodiment of the present disclosure.

Referring to FIG. 7, according to an embodiment of the present disclosure, the fuel door 1 for a vehicle may include at least one support 420. The support 420 can minimize potential damage to the membrane member 40 due to external force.

According to one implementation of the present disclosure, the support 420 extends from the protrusion 20 radially inwards and traverses the hollow 120 or the cross-section of the hollow 120. Although the number of supports 420 is not limited, a plurality of supports 420 may be desirable to provide sufficient support. Further, the support 420 may have various cross-sectional shapes which are not limited to the shape shown in the figures.

The sealing member 60 hermetically seals between the fuel door 1 and the inlet 210 when the fuel door 1 is closed. The sealing member 60 is mounted on the protrusion 20 along the circumference of the membrane member 40.

Figure 8:
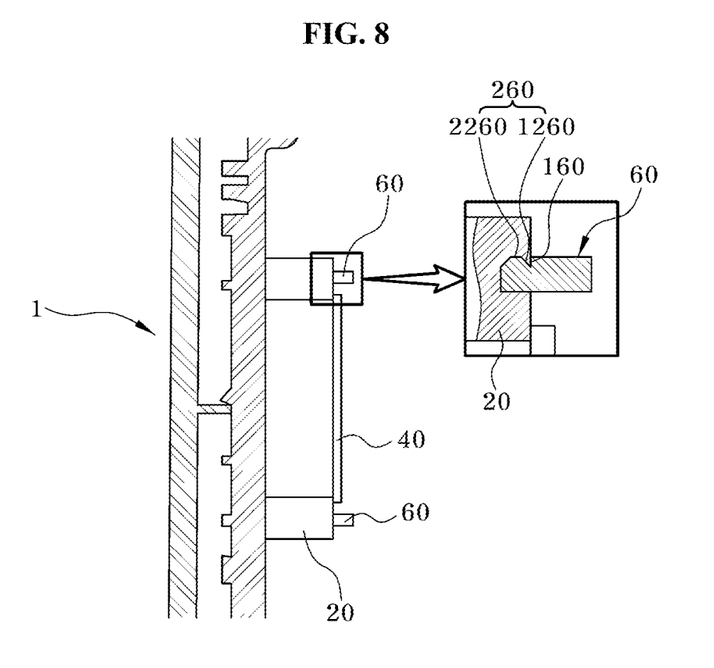
FIG. 8 is a cross-sectional view illustrating one implementation in which a sealing member is coupled to the protrusion of the fuel door according to an embodiment of the present disclosure.

As shown in FIG. 8, according to an embodiment of the present disclosure, the sealing member 60 is coupled to the protrusion 20 and, preferably, to an inside of the protrusion 20. To this end, the coupling part 260 is provided on an attaching surface 160 of the sealing member 60, which is adhered to the protrusion 20. As described above, the coupling part 260 is inserted into the receiving part 320. The coupling part 260 is not detachable once being attached to the receiving part 320.

According to an implementation of the present disclosure, the coupling part 260 may include a first part 1260 having a cross-sectional area smaller than a cross-sectional area of the attaching surface 160, and a second part 2260 having a cross-sectional area greater than the cross-sectional area of the first part 1260. Due to the greater cross-sectional area of the second part 2260, the coupling part 260 became undetachable once being inserted into the receiving part 320. Thus, the sealing member 60 can be kept in place for a long period of time. According to one implementation of the present disclosure, the sealing member 60 may be formed integrally with the fuel door 1 through double injection molding.

Figure 9:
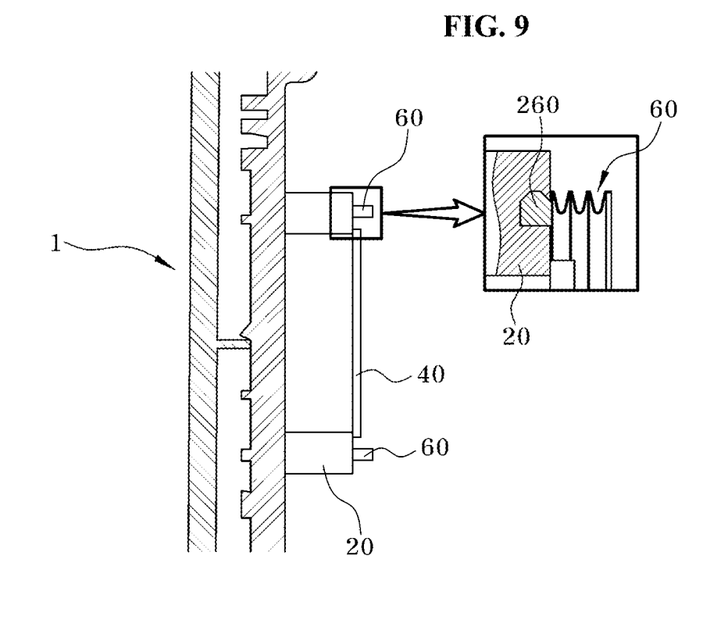
FIG. 9 is a cross-sectional view illustrating an example of the shape of the sealing member of the fuel door according to an embodiment of the present disclosure.
Figure 10:
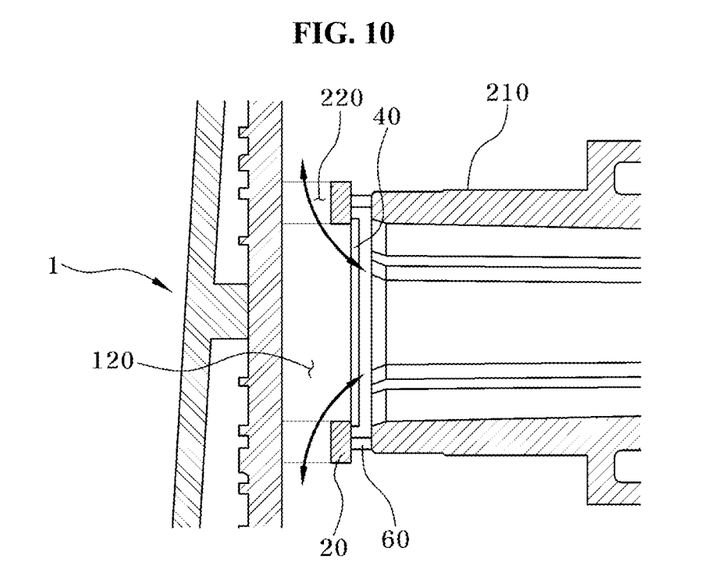
FIG. 10 is a cross-sectional view illustrating ventilation of the fuel door according to an embodiment of the present disclosure.

Referring to FIG. 9, according to an embodiment of the present disclosure, the sealing member 60 may be corrugated having a plurality of ruffles. The restoring force by the ruffles can ensure airtightness between the sealing member 60 and the inlet 210 when the fuel door 1 is closed while the space inside of the fuel door 1 can be effectively ventilated through the cutout part 220 and the hollow 120 of the protrusion 20 (with reference to FIG. 10).

The functions and effects of the fuel door 1 for a vehicle according to the present disclosure and a structure for sealing a cap for urea solution/water injection will be described below.

According to the present disclosure, the fuel door 1 does not essentially require a cap UC/WC for urea solution/water injection.

Figure 11:
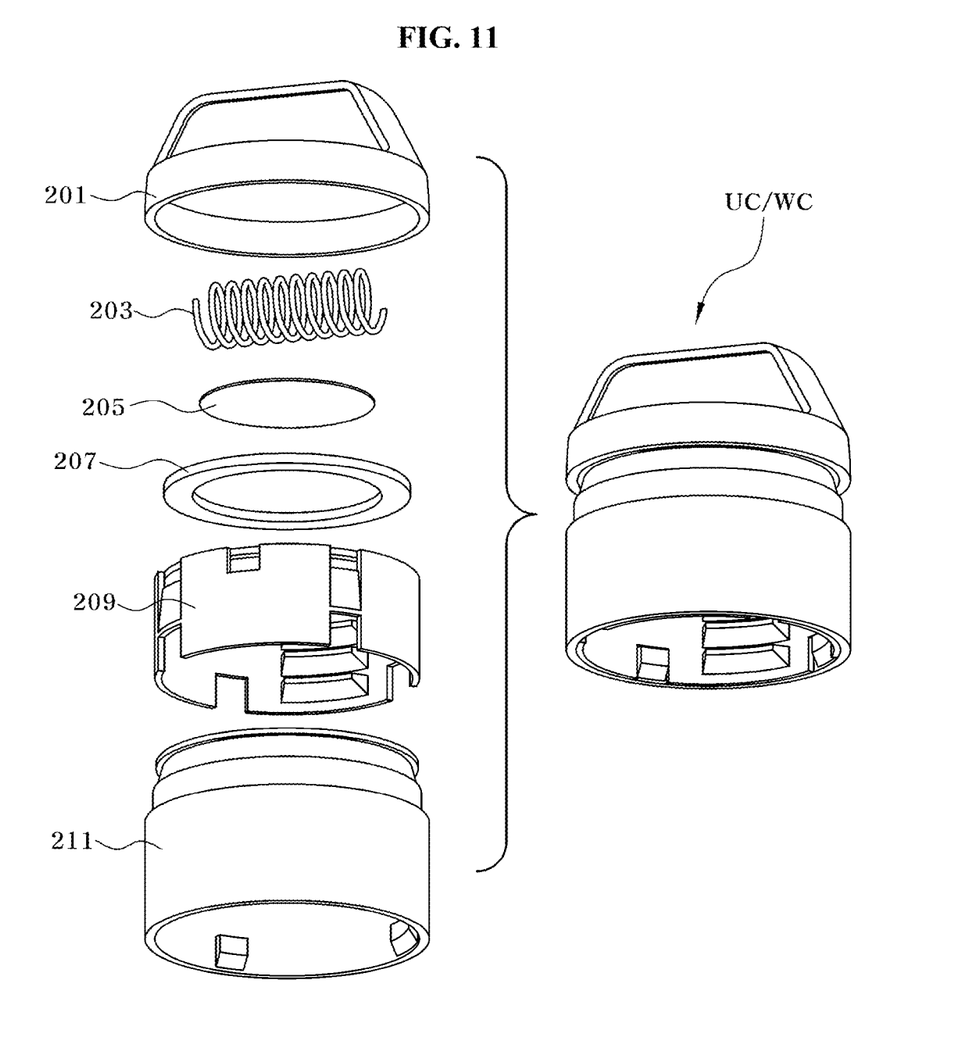
FIG. 11 is an exploded perspective view illustrating components of a cap.

The conventional cap UC/WC for urea solution/water injection requires a cap head 201 for installing the cap UC/WC, a spring 203, a membrane sheet 205, a seal 207, a thread assembly 209 and a lower body 211, as shown in FIG. 11. However, the fuel door according to the present disclosure, which includes the protrusion 20, the membrane member 40 and the sealing member 60, obviates the cap UC/WC, and thus does not require installation of the cap head 201, the spring 203, the thread assembly 209 and the lower body 211. Therefore, according to the present disclosure, lesser number of components are required, thereby simplifying the structure and reducing costs. In addition, the sealing member 60 and the membrane member 40 can be formed by double injection molding when the fuel door is injection-molded according to the present disclosure. The processes for installing and welding the sealing member 60 and the membrane member 40 on and to the protrusion 20 may be omitted.

Figure 12:
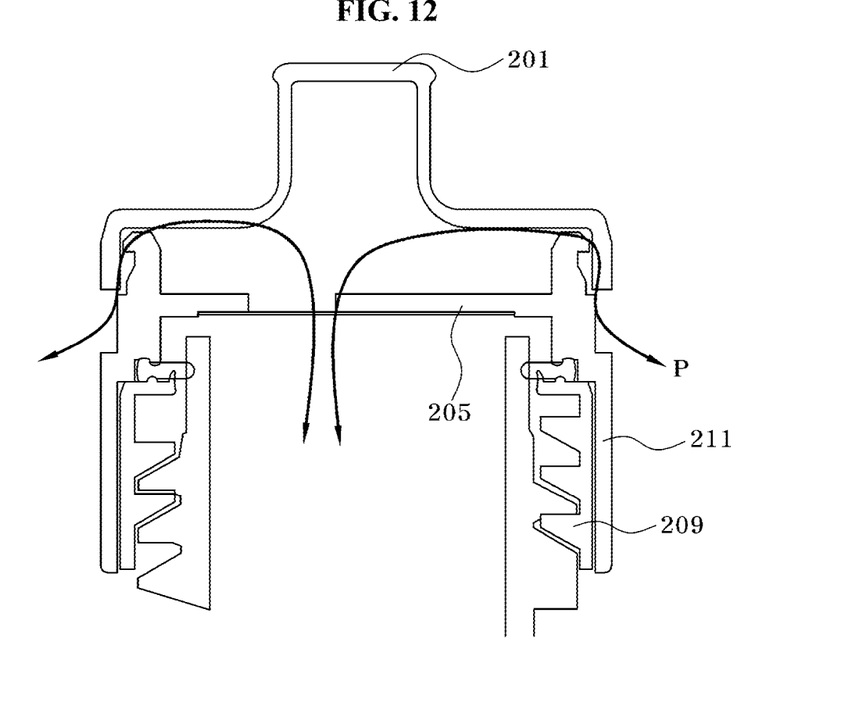
FIG. 12 is a cross-sectional view illustrating ventilation through an inlet on which the cap is installed.

As shown in FIG. 12, the conventional cap UC/WC for urea solution/water injection was designed to prevent foreign substances from entering a vehicle and to prevent the urea solution or water inside the vehicle from leaking to the outside. Further, a ventilation path P indicated by arrows in FIG. 12 is created to balance out pressure imbalance when positive pressure or negative pressure occurs within a urea solution or water tank, thereby maintaining the same pressure as atmospheric pressure.

Figure 13A:
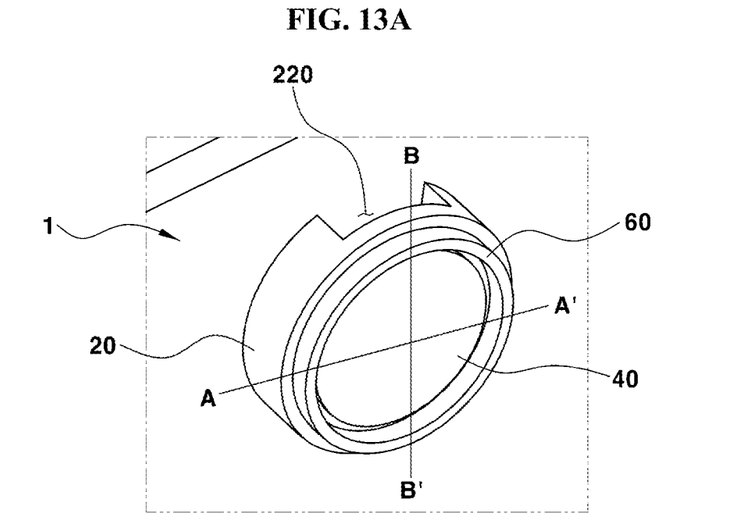
FIG. 13A is a perspective view illustrating the fuel door according to an embodiment of the present disclosure.
Figure 13B:
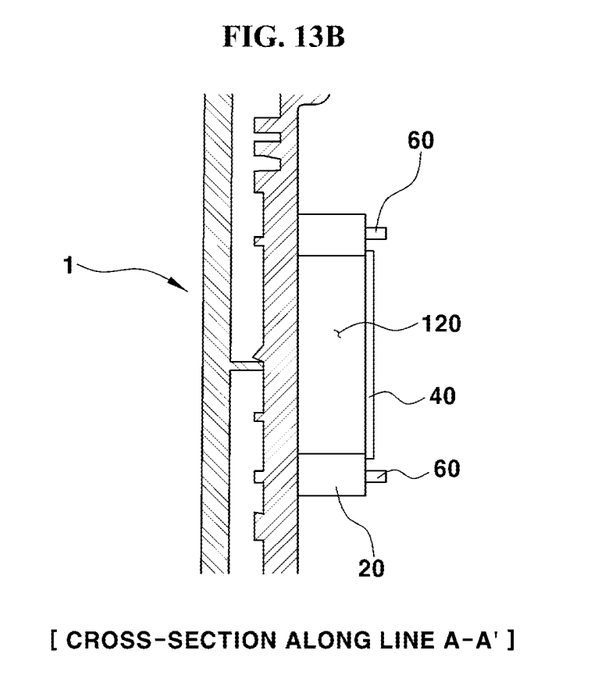
FIG. 13B is a cross-sectional view taken along line A-A' of FIG. 13A.
Figure 13C:
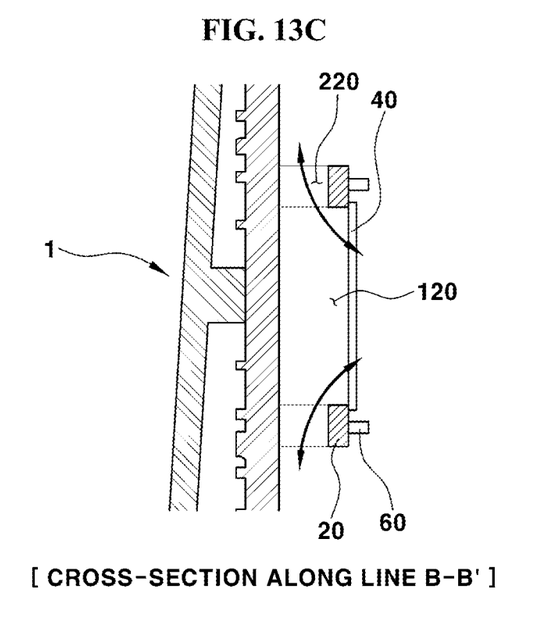
FIG. 13C is a cross-sectional view taken along line B-B' of FIG. 13A.

On the other hand, the fuel door 1 according to the present disclosure can perform the above-mentioned functions of the conventional cap without a cap in place. The fuel door 1 according to the disclosure allows air to move in and out of the vehicle as described below with reference to FIGS. 13A to 13C. FIG. 13A is a perspective view illustrating the protrusion 20 provided on the inner side of the fuel door 1, FIG. 13B is a cross-sectional view taken along line A-A' of FIG. 13A, and FIG. 13C is a cross-sectional view taken along line B-B' of FIG. 13A.

With the fuel door 1 being closed, the sealing member 60 is pressed against the inlet 210, thereby preventing leakage of liquid from the inlet 210 and foreign substances from entering through the inlet 210. Simultaneously, air moves through the cutout part 220 of the protrusion 20 and the membrane member 40 even when the fuel door 1 is closed, which allows negative pressure or positive pressure generated inside the urea or water tank to balance out such that the tank can be kept at the atmospheric pressure.

As is apparent from the above description, a fuel door for a vehicle according to the present disclosure has a structure in which a space inside the fuel door is efficiently used.

The fuel door for a vehicle according to the present disclosure obviates a cap for urea solution or water injection, thus being capable of solving user inconvenience in use.

Further, the fuel door for a vehicle according to the present disclosure obviates the cap for urea solution or water injection, thus being capable of overcoming the cumbersomeness of rotating the cap at every use.

In addition, the fuel door for a vehicle according to the present disclosure obviates the cap for urea solution or water injection, thus being capable of alleviating difficulty in attachment or detachment of the cap due to contamination by the urea solution.

Moreover, the fuel door for a vehicle according to the present disclosure obviates the cap for urea solution or water injection, thus being capable of preventing noise generated by a sealing member installed in the cap.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A fuel door comprising:
a protrusion configured to protrude from an inner side of the fuel door and comprising a hollow and at least one cutout part being in fluid communication with the hollow;
a membrane member coupled to the protrusion so as to cover the hollow of the protrusion; and
a sealing member installed on the protrusion along a circumference of the membrane member.

2. The fuel door of claim 1, wherein the cutout part is provided in at least a part of a circumference of the protrusion.

3. The fuel door of claim 1, further comprising at least one support disposed in the hollow,
wherein the membrane member is pressed against the support.

4. The fuel door of claim 1, wherein the membrane member is coupled to the protrusion through ultrasonic welding.

5. The fuel door of claim 1, wherein the sealing member comprises a coupling part coupled to an inner side of the protrusion, and the protrusion comprises a receiving part configured to be recessed and to have a shape corresponding to a shape of the coupling part.

6. The fuel door of claim 1, wherein the sealing member has a corrugated shape having a plurality of corrugations.

7. A vehicle comprising:
a fuel door pivotally coupled to a vehicle body;
a protrusion configured to protrude from an inner side of the fuel door and comprising a hollow and at least one cutout part being in fluid communication with the hollow;
a membrane member coupled to the protrusion so as to cover the hollow of the protrusion;
a sealing member installed on the protrusion along a circumference of the membrane member; and
an inlet protruding from the vehicle body, and configured to contact the sealing member and to be coaxially disposed with the protrusion when the fuel door is closed.

8. The vehicle of claim 7, wherein the inlet is used to inject a urea solution or water, and a cap is not installed on the inlet.

9. The vehicle of claim 7, wherein the sealing member is configured to detach from the inlet when opening the fuel door.

* * * * *